(12) United States Patent
Prema Mohanasundaram et al.

(10) Patent No.: US 12,496,064 B2
(45) Date of Patent: Dec. 16, 2025

(54) POWERED STAPLING DEVICE WITH MANUAL RETRACTION

(71) Applicant: Covidien LP, Mansfield, MA (US)

(72) Inventors: Suresh Kumar Prema Mohanasundaram, Cheshire, CT (US); David M. Chowaniec, Rocky Hill, CT (US)

(73) Assignee: Covidien LP, Mansfield, MA (US)

( * ) Notice: Subject to any disclaimer, the term of this patent is extended or adjusted under 35 U.S.C. 154(b) by 0 days.

(21) Appl. No.: 18/861,950

(22) PCT Filed: Apr. 25, 2023

(86) PCT No.: PCT/IB2023/054251
§ 371 (c)(1),
(2) Date: Oct. 31, 2024

(87) PCT Pub. No.: WO2023/214250
PCT Pub. Date: Nov. 9, 2023

(65) Prior Publication Data
US 2025/0325264 A1    Oct. 23, 2025

Related U.S. Application Data

(60) Provisional application No. 63/337,676, filed on May 3, 2022.

(51) Int. Cl.
*A61B 17/072*   (2006.01)
*F16D 11/14*    (2006.01)
(Continued)

(52) U.S. Cl.
CPC .......... *A61B 17/072* (2013.01); *F16D 11/14* (2013.01); *F16H 19/04* (2013.01); *F16H 57/021* (2013.01);
(Continued)

(58) Field of Classification Search
CPC ....... A61B 17/072; F16D 11/14; F16H 19/04; F16H 57/021
See application file for complete search history.

(56) References Cited

U.S. PATENT DOCUMENTS 8,479,967 B2 * 7/2013 Marczyk .......... A61B 17/07207
227/176.1
2005/0070958 A1 * 3/2005 Swayze ............ A61B 17/07207
606/219
(Continued)

OTHER PUBLICATIONS

PCT/IB2023/054251, PCT International Search Report, mailed Aug. 3, 2023, 12pages.

*Primary Examiner* — Nathaniel C Chukwurah

(57) ABSTRACT

A powered handle assembly includes a motor assembly, a toothed rack, a drive gear, a clutch assembly, a manual retraction gear, and a retraction knob. The motor assembly is coupled to the drive gear, and the drive gear is movable from a first position engaged with the rack to a second position disengaged from the rack. The clutch assembly includes a lower gear and an upper gear that is coupled to the retraction knob and movable to a position engaged with the lower gear. The lower gear is engaged with the manual retraction gear and the manual retraction gear is engaged with the rack such that rotation of the retraction knob causes longitudinal movement of the rack. The handle assembly allows for manual retraction of a drive assembly of the surgical device when power is lost, or components are damaged.

20 Claims, 9 Drawing Sheets

(51) Int. Cl.
 *F16H 19/04* (2006.01)
 *F16H 57/021* (2012.01)
 *A61B 17/00* (2006.01)
 *F16H 57/02* (2012.01)

(52) U.S. Cl.
 CPC ............... *A61B 2017/00398* (2013.01); *F16H 2057/02034* (2013.01); *F16H 2057/02073* (2013.01)

(56) References Cited

U.S. PATENT DOCUMENTS

| | | | |
|---|---|---|---|
| 2008/0237296 A1* | 10/2008 | Boudreaux | A61B 17/07207 227/176.1 |
| 2010/0089970 A1 | 4/2010 | Smith et al. | |
| 2014/0014707 A1* | 1/2014 | Onukuri | C10M 111/04 227/177.1 |
| 2019/0261984 A1 | 8/2019 | Nelson et al. | |
| 2022/0054125 A1 | 2/2022 | Ji et al. | |

* cited by examiner

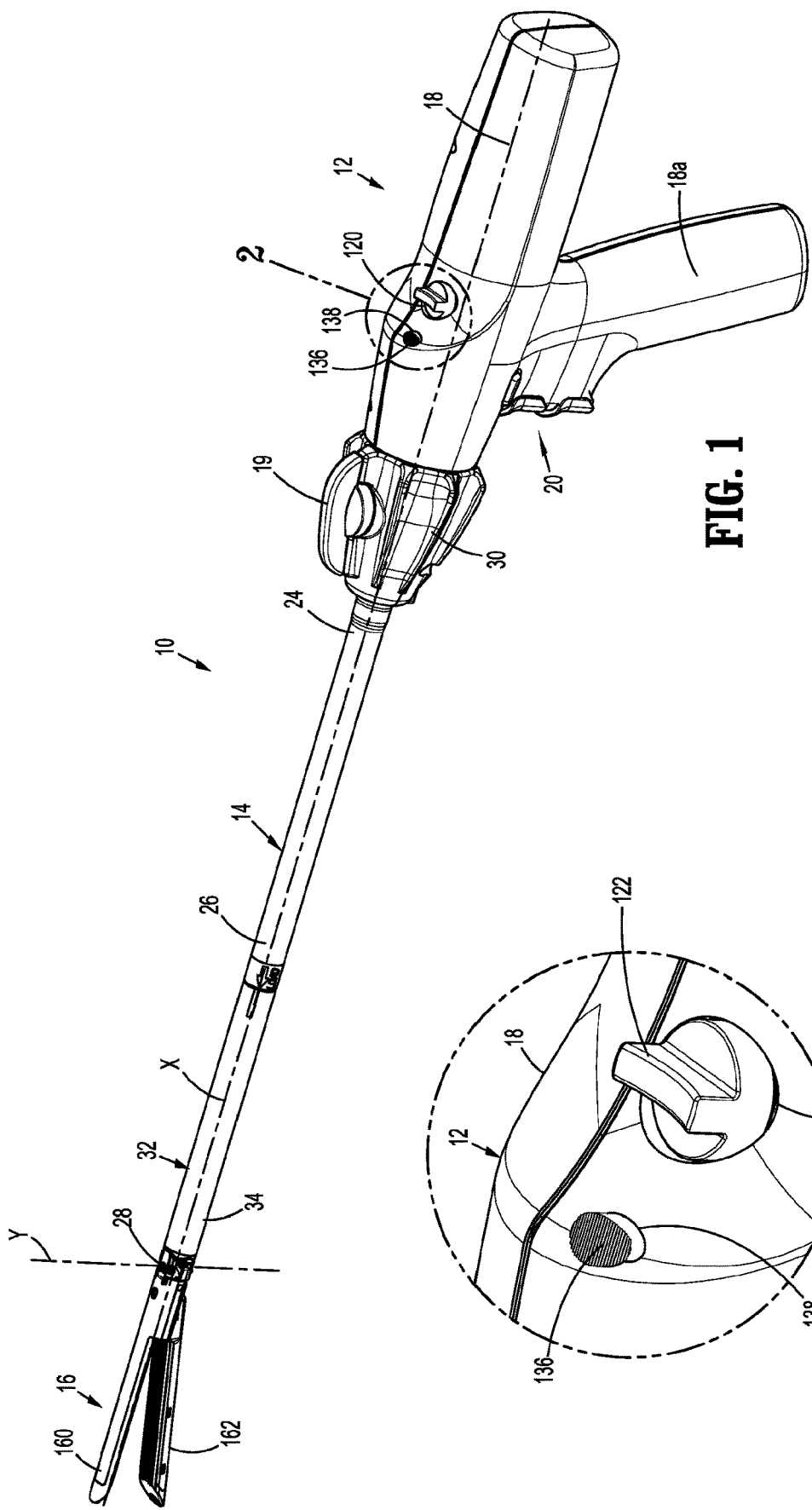
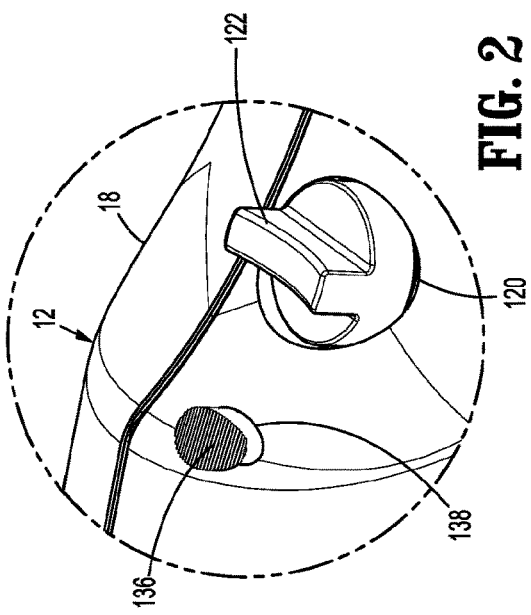
FIG. 1
FIG. 2

POWERED STAPLING DEVICE WITH MANUAL RETRACTION

CROSS-REFERENCE TO RELATED APPLICATIONS

This application is a National Stage Application of PCT/IB2023/054251 filed Apr. 25, 2023, which claims benefit of and priority to U.S. Provisional Application No. 63/337,676 filed May 3, 2022, and the disclosures of each of the above-identified applications are hereby incorporated by reference in their entirety.

FIELD

This disclosure is directed to powered surgical devices and, more particularly, to powered surgical stapling devices with manual retraction mechanisms.

BACKGROUND

Various types of surgical devices used to endoscopically treat tissue are known in the art and are commonly used, for example, for closure of tissue or organs in transection, resection, and anastomoses procedures, for occlusion of organs in thoracic and abdominal procedures, and for electrosurgically fusing or sealing tissue.

One example of such a surgical device is a surgical stapling device. Typically, surgical stapling devices include a tool assembly having an anvil assembly and a cartridge assembly, and a drive assembly. The drive assembly includes a flexible drive beam and a clamp member that is supported on a distal end of the drive beam. The clamp member is movable to through the tool assembly to approximate the cartridge and anvil assemblies and to advance an actuation sled through the cartridge assembly to eject staples from the cartridge assembly.

Surgical stapling devices can be manually actuated devices in which a clinician squeezes a firing trigger to actuate the stapling device, or powered stapling devices in which a clinician activates a motor within the stapling device to actuate the stapling device. Although powered stapling devices require less force to operate, difficulties may arise when the device loses power or components of the device are damaged. In such instances, the device can remain clamped about tissue preventing removal of the device from a patient.

A continuing need exists in the art for a powered stapling device that includes a drive assembly that can be manually retracted when power is lost or when the device is not operational.

SUMMARY

This disclosure is directed to a powered handle assembly for a surgical device that allows for manual retraction of a drive assembly of the surgical device when power is lost, or components are damaged.

Aspects of this disclosure are directed to a powered handle assembly for a surgical device including a housing defining a housing cavity, a gear casing, a motor assembly, a toothed rack, a post, a clutch assembly, a manual retraction gear, and a retraction knob. The gear casing is supported within the housing cavity and defines a casing cavity and a longitudinal channel that extends through the casing cavity. The motor assembly includes an output shaft and an output gear secured to the output shaft. The output gear is positioned within the casing cavity. The toothed rack is received within the longitudinal channel of the gear casing and is movable through the casing cavity between retracted and advanced positions. The post supports a drive gear that is engaged with the output gear within the casing cavity. The post is movable in relation to the gear casing to move the drive gear between first and second drive gear positions. The drive gear is engaged with the toothed rack in the first drive gear position and disengaged from the toothed rack in the second drive gear position. The clutch assembly includes an upper gear and a lower gear. The lower gear is engaged with the rack, and the upper gear is movable between a first upper gear position and a second upper gear position. The upper gear is engaged with the lower gear in the second upper gear position and disengaged from the lower gear in the first upper gear position. Rotation of the upper gear in the second upper gear position causes rotation of the lower gear. The manual retraction gear is engaged with the rack and is coupled to the lower gear such that rotation of the lower gear causes rotation of the manual retraction gear. The retraction knob is positioned adjacent an outer surface of the housing, is secured to the upper gear of the clutch assembly and is manually rotatable to rotate the upper gear.

Other aspects of the disclosure are directed to a surgical stapling device including an elongate body, a tool assembly, and a handle assembly. The elongate body has a proximal portion and a distal portion, and the tool assembly is supported on the distal portion of the elongate body. The handle assembly is coupled to the proximal portion of the elongate body and includes a housing defining a housing cavity, a gear casing, a motor assembly, a toothed rack, a post, a clutch assembly, a manual retraction gear, and a retraction knob. The gear casing is supported within the housing cavity and defines a casing cavity and a longitudinal channel that extends through the casing cavity. The motor assembly includes an output shaft and an output gear that is secured to the output shaft and is positioned within the casing cavity. The toothed rack is received within the longitudinal channel of the gear casing and is movable through the casing cavity between retracted and advanced positions. The post supports a drive gear that is engaged with the output gear within the casing cavity and is movable in relation to the gear casing to move the drive gear between first and second drive gear positions. The drive gear is engaged with the toothed rack in the first drive gear position and disengaged from the toothed rack in the second drive gear position. The clutch assembly includes an upper gear and a lower gear. The lower gear is engaged with the rack, and the upper gear is movable between a first upper gear position and a second upper gear position. The upper gear is engaged with the lower gear in the second upper gear position and disengaged from the lower gear in the first upper gear position such that rotation of the upper gear in the second upper gear position causes rotation of the lower gear. The manual retraction gear is engaged with the rack and is coupled to the lower gear such that rotation of the lower gear causes rotation of the manual retraction gear. The retraction knob is positioned adjacent an outer surface of the housing, is secured to the upper gear of the clutch assembly and is manually rotatable to rotate the upper gear.

Other aspects of the disclosure are directed to a handle assembly for a surgical device that includes a housing defining a housing cavity, a motor assembly, a toothed rack, a post, a clutch assembly, a manual retraction gear, and a retraction knob. The motor assembly includes an output shaft and an output gear that is secured to the output shaft and is positioned within the housing cavity. The toothed rack is received within the housing cavity and is movable through the housing cavity between retracted and advanced positions. The post supports a drive gear that is engaged with the output gear within the housing cavity. The post is movable to move the drive gear between first and second drive gear positions. The drive gear is engaged with the toothed rack in the first drive gear position and disengaged from the toothed rack in the second drive gear position. The clutch assembly includes an upper gear and a lower gear. The lower gear is engaged with the rack, and the upper gear is movable between a first upper gear position and a second upper gear position. The upper gear is engaged with the lower gear in the second upper gear position and disengaged from the lower gear in the first upper gear position. Rotation of the upper gear in the second upper gear position causes rotation of the lower gear. The manual retraction gear is engaged with the rack and is coupled to the lower gear such that rotation of the lower gear causes rotation of the manual retraction gear. The retraction knob is positioned adjacent an outer surface of the housing, is secured to the upper gear of the clutch assembly and is manually rotatable to rotate the upper gear.

In aspects of the disclosure, the handle assembly includes a retraction button that is secured to the post and extends through the housing and is depressible to move the drive gear from the first drive gear position to the second drive gear position.

In some aspects of the disclosure, the handle assembly includes a bridge that secures the post to the upper gear of the clutch assembly, such that depression of the retraction button causes movement of the drive gear from the first drive gear position to the second drive gear position and movement of the upper gear from the first upper gear position to the second upper gear position.

In certain aspects of the disclosure, the handle assembly includes a biasing member that is positioned to urge the drive gear towards the first drive gear position.

In aspects of the disclosure, the upper gear of the clutch assembly includes a central hub and a gear member supported on one end of the central hub.

In some aspects of the disclosure, the central hub defines a through bore and the gear member has an outer surface with gear teeth.

In certain aspects of this disclosure, the lower gear of the clutch assembly defines a cylindrical recess that is bounded by an inner annular wall having gear teeth.

In aspects of the disclosure, the gear teeth of the gear member of the upper gear are engaged with the gear teeth on the inner annular wall of the lower gear when the upper gear is in the second upper gear position such that rotation of the upper gear causes rotation of the lower gear.

In some aspects of the disclosure, the lower gear of the clutch assembly defines a central bore, and the manual retraction gear includes a central shaft and a gear member.

In certain aspects of the disclosure, the gear member of the manual retraction gear is engaged with the toothed rack and the central shaft of the manual retraction gear extends through the central bore of the lower gear and into the through bore of the central hub of the upper gear.

In aspects of this disclosure, the lower gear defines notches that communicate with the central bore of the lower gear, and the central hub of the upper gear includes ribs that are received in the notches to secure the manual retraction gear to the lower gear.

Other features of the disclosure will be appreciated from the following description.

BRIEF DESCRIPTION OF THE DRAWINGS

Various aspects of the disclosed surgical device are described herein below with reference to the drawings, wherein:

FIG. 1 is a side perspective view of a surgical device according to aspects of the disclosure with a tool assembly of the surgical device in a non-articulated, unclamped position;

FIG. 2 is an enlarged view of the indicated area of detail shown in FIG. 1;

DETAILED DESCRIPTION

Figure 3:
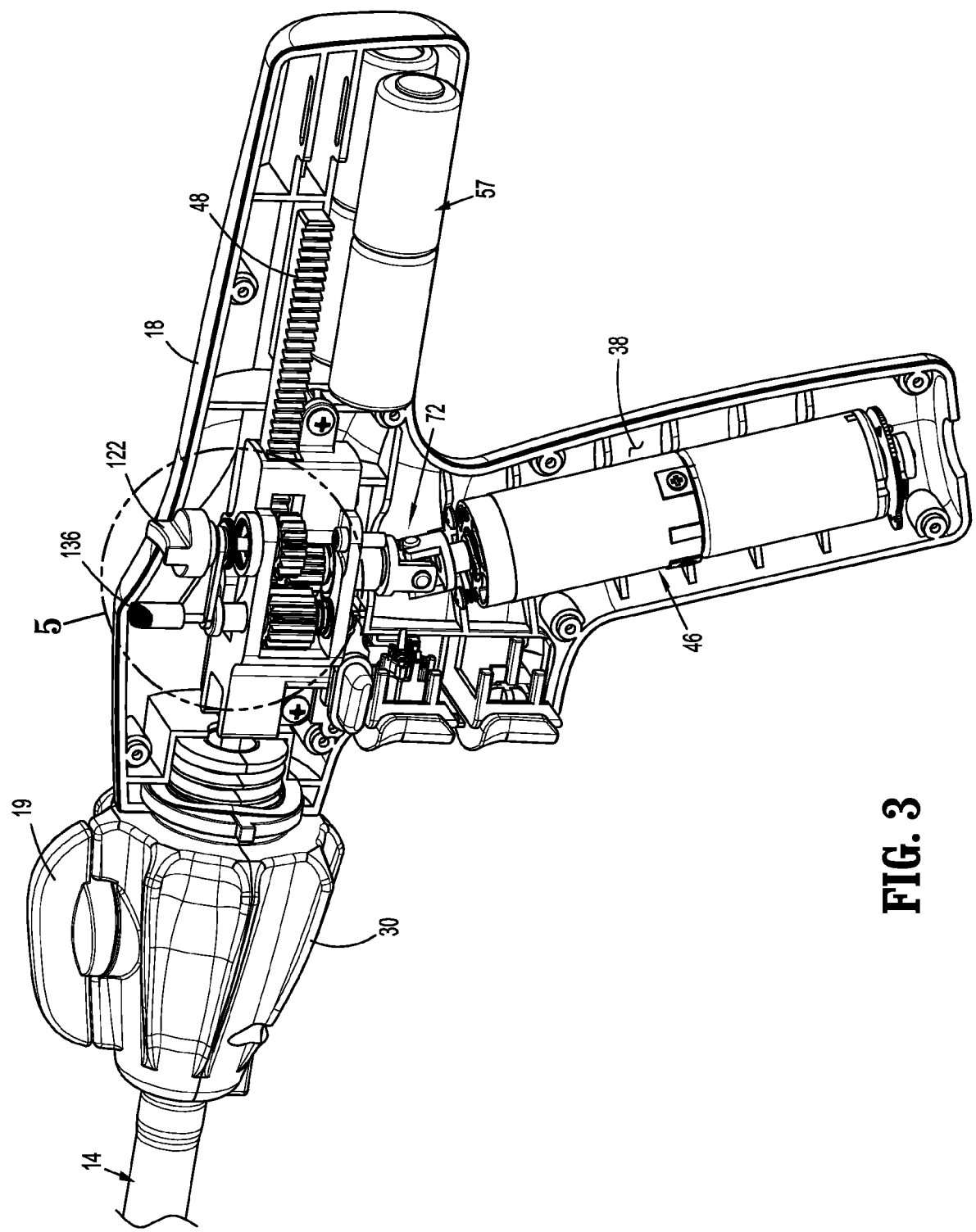
FIG. 3 is a side perspective view of a handle assembly of the surgical device shown in FIG. 1 with a half-section of the housing of the handle assembly removed.

The disclosed surgical device will now be described in detail with reference to the drawings in which like reference numerals designate identical or corresponding elements in each of the several views. However, it is to be understood that aspects of the disclosure are merely exemplary of the disclosure and may be embodied in various forms. Well-known functions or constructions are not described in detail to avoid obscuring the disclosure in unnecessary detail. Therefore, specific structural and functional details disclosed herein are not to be interpreted as limiting, but merely as a basis for the claims and as a representative basis for teaching one skilled in the art to variously employ the disclosure in virtually any appropriately detailed structure.

In this description, the term "proximal" is used generally to refer to that portion of the device that is closer to a clinician during use of the device in its customary fashion, while the term "distal" is used generally to refer to that portion of the device that is farther from the clinician during use of the device in its customary fashion. In addition, directional terms such as front, rear, upper, lower, top, bottom, and similar terms are used to assist in understanding the description and are not intended to limit the disclosure. Further, the term "clinician" is used generally to refer to medical personnel including doctors, nurses, surgeons, and support personnel.

This disclosure is directed to a surgical device that includes a powered handle assembly with manually retraction capabilities. The handle assembly includes a motor assembly, a rack, and a retraction knob. The motor assembly includes a drive gear that is coupled to the rack and is operable to advance and retract the rack. The retraction knob is coupled to the rack by a clutch assembly and a manual retraction gear to facilitate manual retraction of the rack.

FIGS. 1 and 2 illustrate a surgical device shown generally as stapling device 10 which includes a handle assembly 12, an elongate body or adapter assembly 14, and a tool assembly 16. The handle assembly 12 includes a housing 18 that forms a stationary handle portion 18a, an articulation lever 19, and an actuation button 20. The housing 18 of the handle assembly 12 is formed from half-sections that are coupled together such as by welding or with screws to define a cavity 38 (FIG. 3) that receives internal components of the handle assembly 12 which are described in further detail below.

The elongate body 14 defines a longitudinal axis "X" and includes a proximal portion 24 that is coupled to the handle assembly 12, and a distal portion 26 that supports the tool assembly 16. The tool assembly 16 is secured to the distal portion 26 of the elongate body 14 by a pivot member 28 that defines an axis "Y" that is transverse to the longitudinal axis "X". The articulation lever 19 is operatively coupled to the tool assembly 16 via an articulation linkage (not shown) such that manipulation of the articulation lever 19 causes articulation of the tool assembly 16 about the axis "Y" between a non-articulated position in which the tool assembly 16 defines a longitudinal axis that is aligned with the longitudinal axis "X" of the elongate body 14 and non-articulated positions in which a longitudinal axis of the tool assembly 16 and the longitudinal axis "X" of the elongate body 14 define acute angles.

The proximal portion 24 of the elongate body 14 is supported within a rotation knob 30 that is rotatably coupled to a distal portion of the handle assembly 12. The rotation knob 30 is manually rotatable about the longitudinal axis "X" to rotate the elongate body 14 and the tool assembly 16 about the longitudinal axis "X". The actuation button 20 controls operation of the different functions of the stapling device 10 including clamping and firing of the stapling device 10.

In certain aspects of the disclosure, the tool assembly 16 forms part of a reload assembly 32 that includes a proximal body portion 34 and the tool assembly 16. The proximal body portion 34 of the reload assembly 32 forms an extension of the elongate body 14 and includes a proximal end that is adapted to be releasably coupled to a distal end of the elongate body 14 and a distal end that supports the tool assembly 16 for articulation. In aspects of the disclosure, the tool assembly 16 can be fixedly coupled to a distal portion of the elongate body 14.

Figure 4:
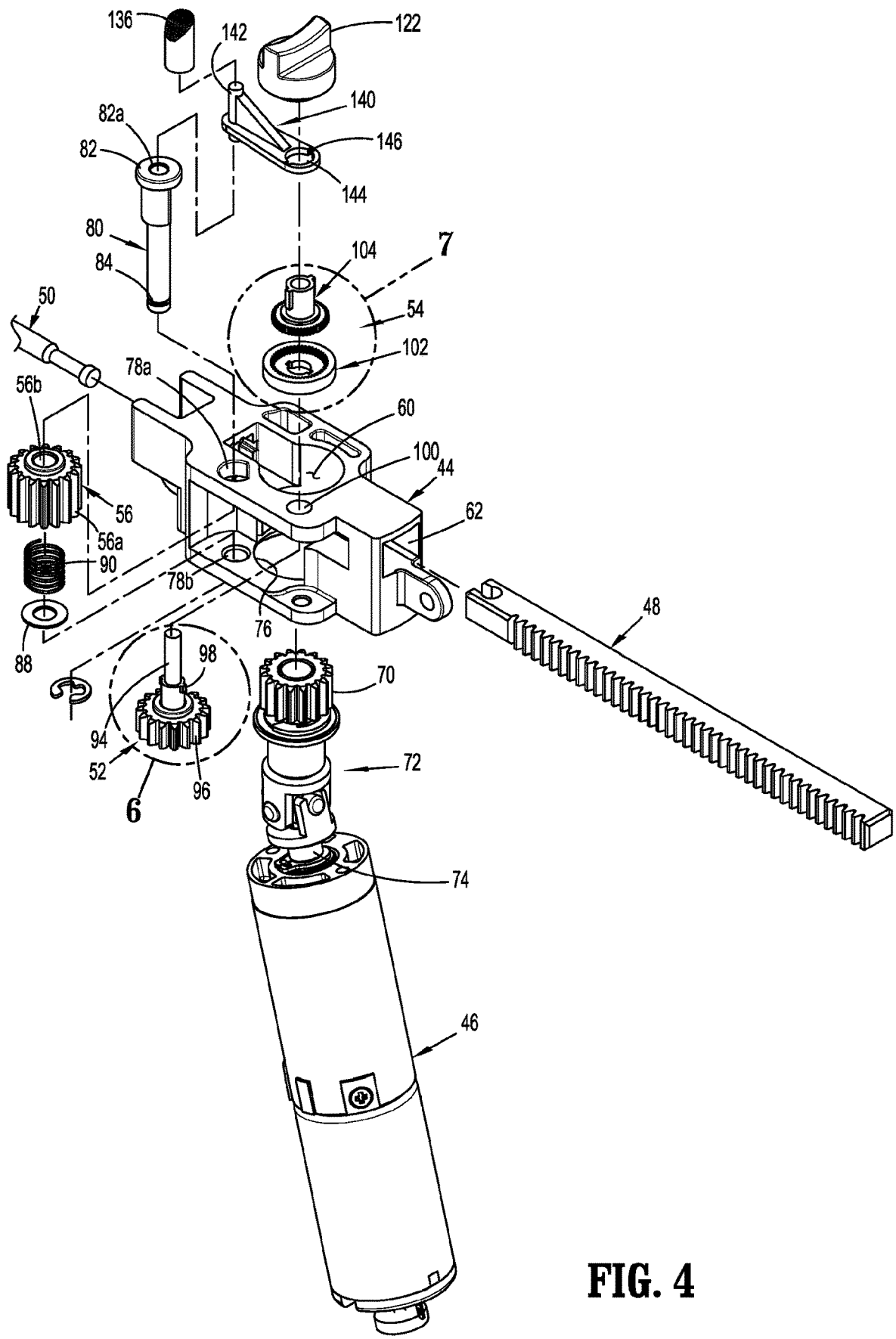
FIG. 4 is an exploded side perspective view of internal components of the handle assembly shown in FIG. 3.

FIGS. 3 and 4 illustrate internal components of the handle assembly 12 (FIG. 1) which include an inner casing 44, a motor assembly 46, a toothed rack 48, a firing rod 50, a manual retraction gear 52, a clutch assembly 54, and a spur or drive gear 56. In aspects of the disclosure, the handle assembly also includes one or more batteries 57 that are electrically coupled to the motor assembly 46 to power the motor assembly 46. The gear casing 44 is secured within the cavity 38 (FIG. 3) of the housing 18 using screws or the like and defines a casing cavity 60 and a longitudinally extending channel 62 (FIG. 4). The longitudinally extending channel 62 extends from a proximal end of the gear casing 44 to a distal end of the gear casing 44 through the casing cavity 60. The drive gear 56 is supported within the casing cavity 60, includes gear teeth 56a, and defines a through bore 56b. The toothed rack 48 is slidably positioned within the longitudinally extending channel 62 of the gear casing 44 and includes gear teeth 48a that mesh with the gear teeth 56a of the drive gear 56. When the drive gear 56 is rotated, engagement between the drive gear 56 and the toothed rack 48 causes the toothed rack 48 to move longitudinally within the channel 64 in the gear casing 44.

The motor assembly 46 includes an output gear 70 (FIG. 4) that is engaged with the drive gear 56 and can be activated via the actuation button 20 (FIG. 1) to rotate the drive gear 56. In aspects of the disclosure, the motor assembly 46 is positioned within a portion of the cavity 38 of the housing 18 defined by the stationary handle portion 18a (FIG. 3) and includes a linkage 72 (FIG. 4) that couples an output shaft 74 of the motor assembly 46 to the output gear 70. The gear casing 44 defines a lower opening 76 that facilitates passage of the output gear 70 of the motor assembly 46 into the casing cavity 60 to a position adjacent to and engaged with the drive gear 56.

The gear casing 44 defines upper and lower openings 78a and 78b (FIG. 4) that receive a post 80. The post 80 includes an upper head portion 82 that defines a bore 82a and a lower portion that defines an annular groove 84. In aspects of the disclosure, the head portion has a diameter that is larger than the diameter of the remaining portion of the post 80. The post 80 extends through the upper opening 78a in the gear casing 44, through the through bore 56b of the drive gear 56, and through the lower opening 78b in the gear casing 44 to rotatably support the drive gear 56 within the casing cavity 60 about the post 80. The head portion 82 of the post 80 is positioned adjacent an upper surface of the gear casing 44 and has a diameter that is larger than the diameter of the opening 78a to prevent passage of the head portion 82 of the post 80 though the upper opening 78a of the gear casing 44. The annular groove 84 (FIG. 4) in the post 80 receives an annular washer 88 that is positioned about the post 80 against a bottom surface of the gear casing 44 to prevent passage of the post 80 through the lower opening 78b of the gear casing 44. The drive gear 56 is movable vertically about the post 80 within the casing cavity 60 from a first position (FIG. 10) engaged with the toothed rack 48 to a second position (FIG. 12) disengaged from the toothed rack 48. In aspects of the disclosure, the post 80 and the upper opening 78a in the gear casing 44 have D-shaped configurations to prevent rotation of the post 80 in relation to the gear casing 44.

A biasing member 90 is positioned within the casing cavity 60 between the drive gear 56 and the gear casing 44 to urge the drive gear 56 towards the first position in which the drive gear 56 is engaged with the toothed rack 48. When the drive gear 56 is in the first position and the motor assembly 46 is activated via operation of the actuation button 20, the drive gear 56 advances or retracts the toothed rack 48 within the longitudinal channel 62 (FIG. 4) of the gear casing 44. In aspects of the disclosure, the biasing member 90 includes a coil spring although the use of other types of biasing members is envisioned.

Figure 5:
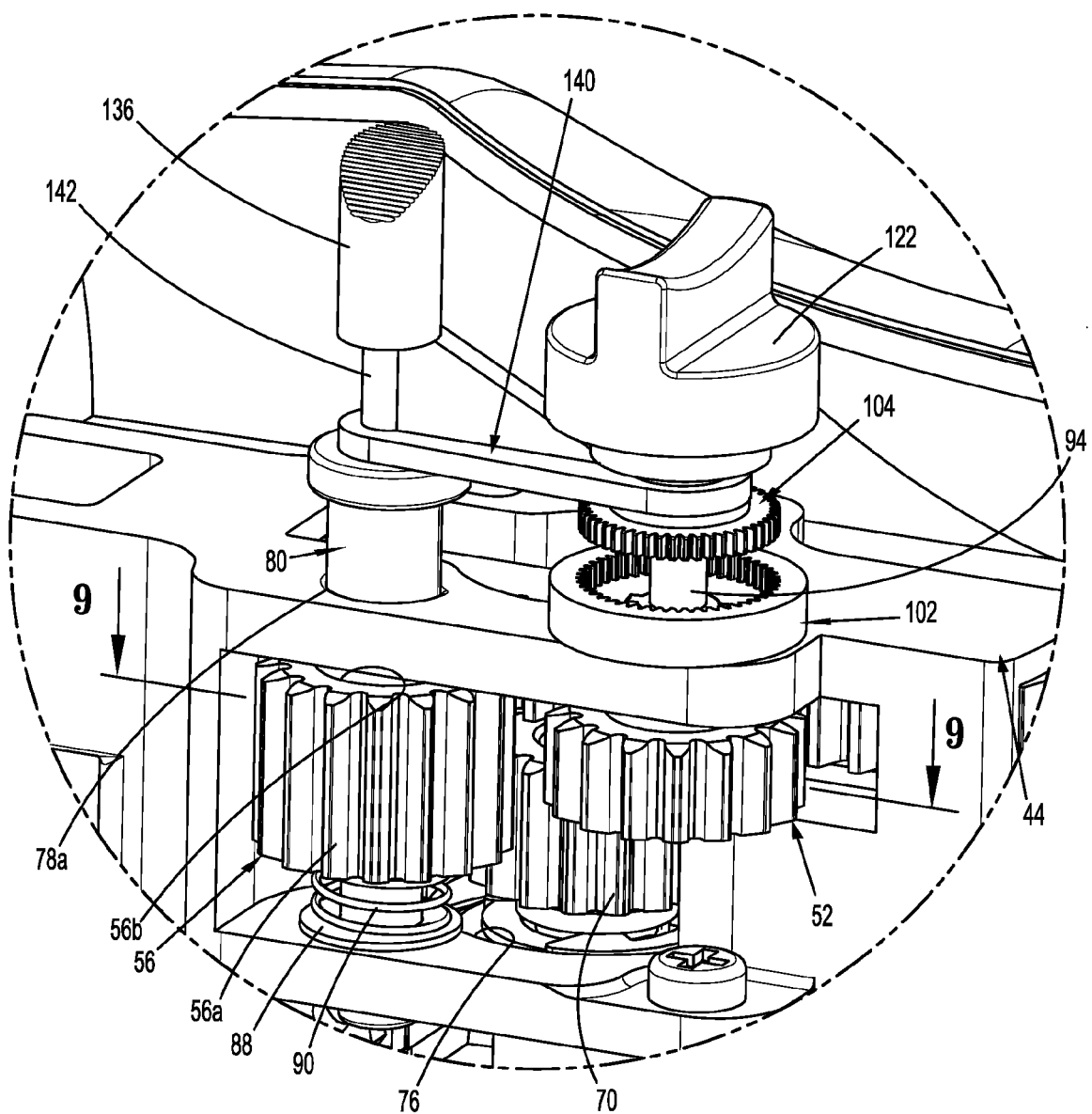
FIG. 5 is an enlarged view of the indicated area of detail shown in FIG. 3.
Figure 6:
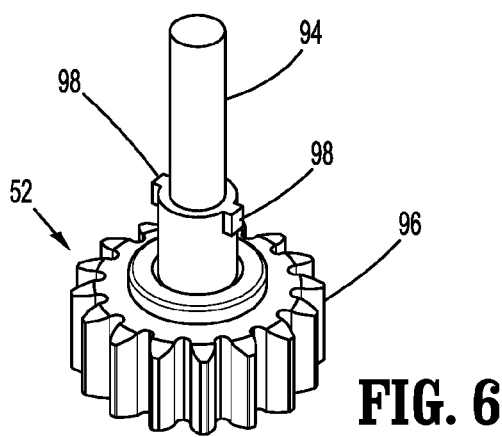
FIG. 6 is an enlarged view of the indicated area of detail shown in FIG. 4.

FIGS. 4-6 illustrate the manual retraction gear 52 which includes a central shaft 94 and a gear member 96 fixedly secured to a lower end of the central shaft 94. The central shaft 94 of the manual retraction gear 52 is stepped and includes radially extending ribs 98 (FIG. 6) formed on a lower portion of the central shaft 94. The central shaft 94 extends upwardly through an opening 100 (FIG. 4) defined in the gear casing 44 to a position above the gear casing 44. The gear member 96 of the manual retraction gear 52 is supported within the casing cavity 60 of the gear casing 44 and is engaged with the toothed rack 48. The radially extending ribs 98 rest on the upper surface of the gear casing 44 and prevent the central shaft 94 from passing through the opening 100 in the gear casing 44.

Figure 7:
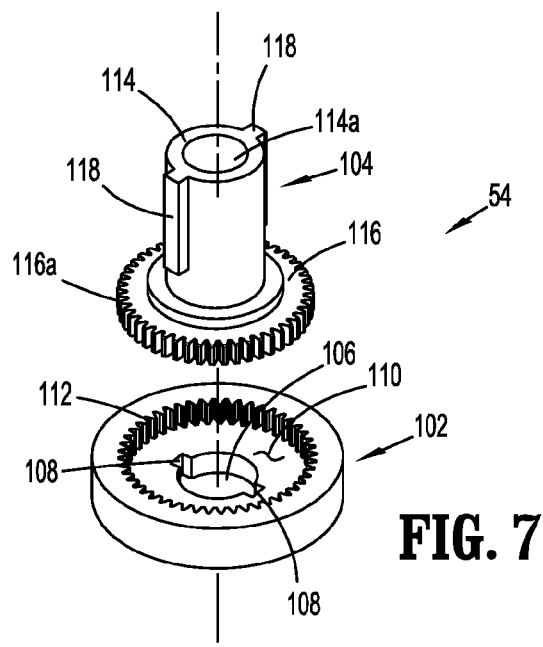
FIG. 7 is an enlarged view of the indicated area of detail shown in FIG. 4.

FIGS. 4, 5, and 7 illustrate the clutch assembly 54 which includes a lower gear 102 and an upper gear 104. The lower gear 102 is positioned on the upper surface of the gear casing 44 and defines a central bore 106 that has radial slots 108 (FIG. 7). The central bore 106 of the lower gear 102 receives the central shaft 94 of the manual retraction gear 52 to position such that the radial slots 108 of the central bore 106 of the lower gear 102 receive the radially extending ribs 98 of the central shaft 94. When the ribs 98 are received in the slots 108, the manual retraction gear 52 is secured to the lower gear 102 such that rotation of the lower gear 102 causes corresponding rotation of the manual retraction gear 52. The lower gear 102 defines a cylindrical recess 110 (FIG. 7) that is bounded by an inner annular wall that includes an annular array of gear teeth 112.

The upper gear 104 of the clutch mechanism 54 includes a central hub 114 and a gear member 116. The central hub 114 defines a through bore 114a that receives the central shaft 94 of the manual retraction gear 52. In aspects of the disclosure, the central hub 114 is cylindrical and includes radially extending ribs 118. The gear member 116 is secured to or formed integrally with a lower end of the central hub 114 and includes an outer surface that has gear teeth 116a. The upper gear 104 is positioned above the recess 110 of the lower gear 102 about the central shaft 94 of the manual retraction gear 52 and is movable downwardly from a first position disengaged from the lower gear 102 to a second position within the recess 110 of the lower gear 102. When the gear member 116 of the upper gear 104 is received within the recess 110 of the lower gear 102, the gear teeth 116a of the upper gear 104 engage the gear teeth 112 of the lower gear 102 to secure the upper gear 104 to the lower gear 102. When the upper gear 104 is in the second position engaged with the lower gear 102, rotation of the upper gear 104 causes rotation of the lower gear 102. As described above, the manual retraction gear 52 is secured to the lower gear 102. As such, rotation of the upper gear 104 causes rotation of the manual retraction gear 52.

Figure 8:
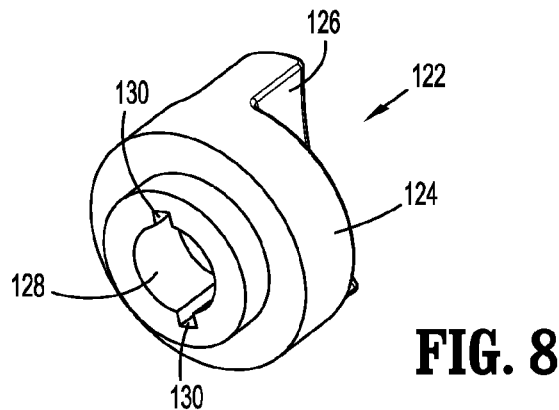
FIG. 8 is a bottom perspective view of a manual retraction knob of the handle assembly shown in FIG. 4.

The central hub 114 of the upper gear 104 extends upwardly into or through an opening 120 (FIG. 1) in the housing 18 of the handle assembly 12 and supports a manual retraction knob 122 that is positioned adjacent an external surface of the housing 18 of the handle assembly 12 (FIG. 1). The manual retraction knob 122 includes a body portion 124 (FIG. 8) and an upwardly extending grip portion 126. The body portion 124 of the manual retraction knob 122 defines a bore 128 that includes two slots 130. The bore 128 receives the upper end of the central hub 114 of the upper gear 104 of the clutch assembly 54 such that the radially extending ribs 118 of the upper gear 104 are received within the slots 130 of the manual retraction knob 122 to fixedly secure the manual retraction knob 122 to the upper gear 104.

The post 80 supports a retraction button 136 (FIG. 4) that extends upwardly from the post 80 through an opening 138 (FIG. 1) formed in the housing 18 of the handle assembly 12 (FIG. 1). The retraction button 136 can be depressed to move the post 80 downwardly within the cavity 38 of the handle assembly 12 to move the drive gear 56 against the urging of biasing member 90 from the first position of the drive gear 56 to the second position of the drive gear 56.

The post 80 is coupled to the upper gear 104 of the clutch assembly 54 by a bridge 140 (FIG. 4). In aspects of the disclosure, the bridge 140 has first end that includes a cylindrical member 142 and a second end that has an opening 144. The cylindrical member 142 has a first end that is received in the opening 82a of the post 80 and a second end that is received in an opening (not shown) in the retraction button 136 to secure the retraction button 136 to the post 80. The opening 144 of the bridge 140 receives the central hub 114 (FIG. 7) of the upper gear 104 of the clutch assembly 54 to secure the bridge 140 to the upper gear 104. The opening 144 in the bridge 140 is substantially circular and includes slots 146 (FIG. 4) that receive and allow passage of the ribs 118 (FIG. 7) of the upper gear 104 of the clutch assembly 54 as the bridge 140 is coupled to the upper gear 104. The second end of the bridge 140 is supported about the central hub 114 of the upper gear 104 beneath the ribs 118 to allow rotation of the upper gear 104 within the opening 146 of the bridge 140. When the retraction button 136 is depressed, the post 80 and the upper gear 104 of the clutch assembly 54 move in unison downwardly within the housing 18 of the handle assembly 12 to move the drive gear 56 and the upper gear 102 from their first positions to their second positions.

Figure 9:
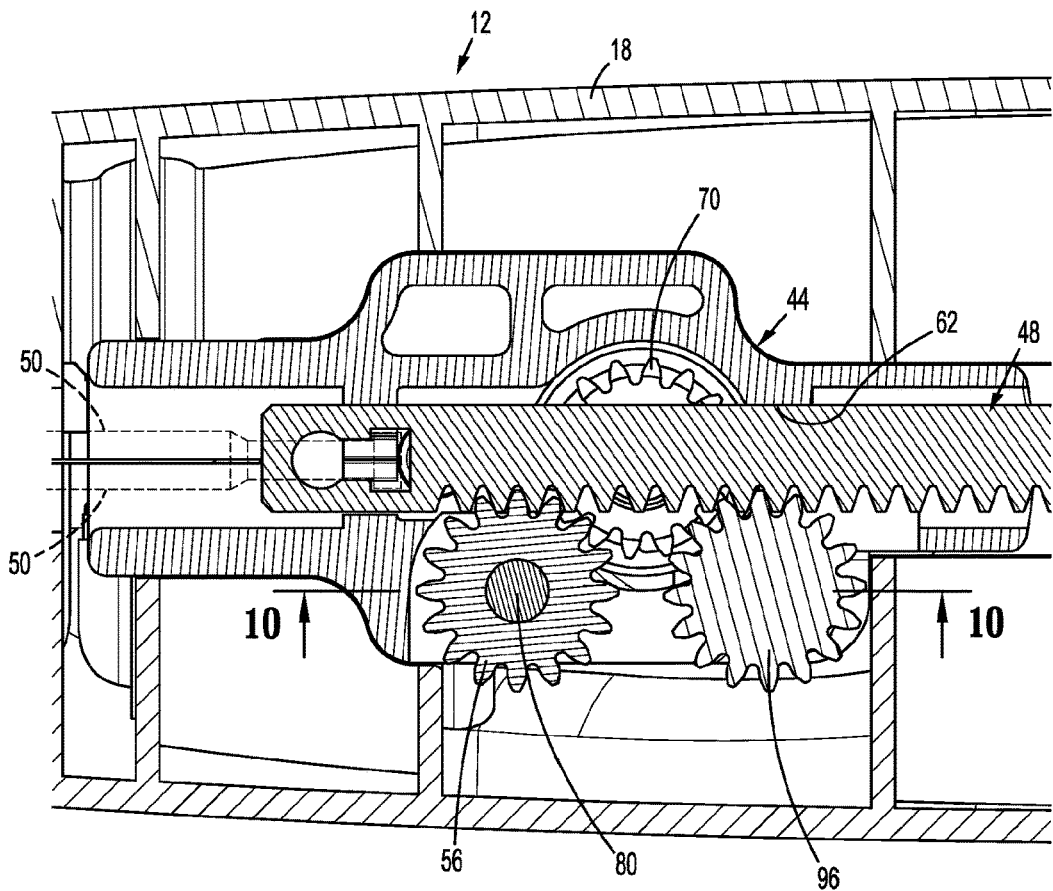
FIG. 9 is a cross-sectional view taken through the handle assembly of the surgical device shown in FIG. 1 with the surgical device in the unclamped position and the manual retraction knob in a disengaged position.
Figure 10:
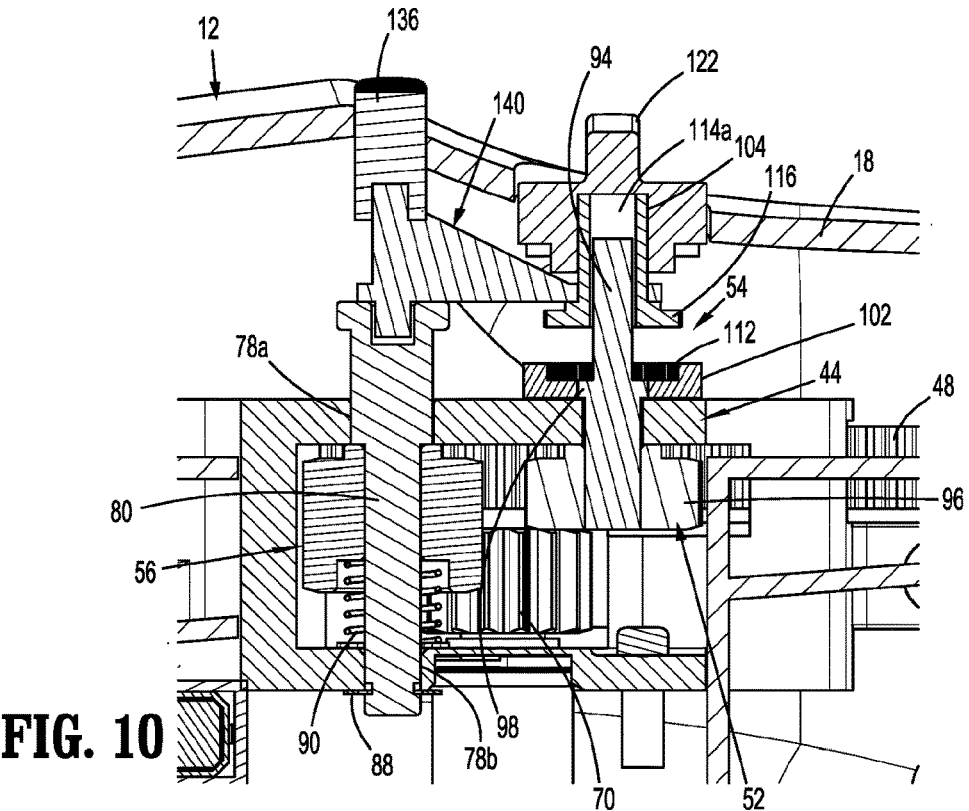
FIG. 10 is a cross-sectional view taken along section line 10-10 of FIG. 9.

FIGS. 1, 9, and 10 illustrate the internal components of the stapling device 10 with the stapling device 10 in the unclamped, pre-fired position. In this position, the biasing member 90 (FIG. 10) urges the drive gear 56 to the first position of the drive gear 56 into engagement with the toothed rack 48. The drive gear 56 is secured to the post 80 such that the post 80 is also urged to its uppermost position by the biasing member 90. The post 80 is coupled to the upper gear 104 of the clutch assembly 54 such that the upper gear 104 of the clutch assembly 54 is retained in its first position disengaged from the lower gear 102 of the clutch assembly 54. When the motor assembly 46 (FIG. 4) is activated in this position, the output gear 70 of the motor assembly 46 rotates the drive gear 56 to advance (or retract) the toothed rack 48 within the channel 62 of the gear casing 44 to advance (or retract) the firing rod 50.

In aspects of the disclosure, the tool assembly (FIG. 1) includes an anvil 160 and a cartridge assembly 162 that is pivotably supported in relation to the anvil 160. The firing rod 150 FIG. 9) is coupled to a drive assembly (not shown) that is movable in relation to the anvil 160 and the cartridge assembly 162 to move the tool assembly 16 from the unclamped position (FIG. 1) to the clamped position (FIG. 11) and to eject staples from the cartridge assembly 162. U.S. Pat. No. 6,241,139 discloses a tool assembly 16 including an anvil, a cartridge assembly, and a drive assembly suitable for use with the disclosed handle assembly 12.

Figure 11:
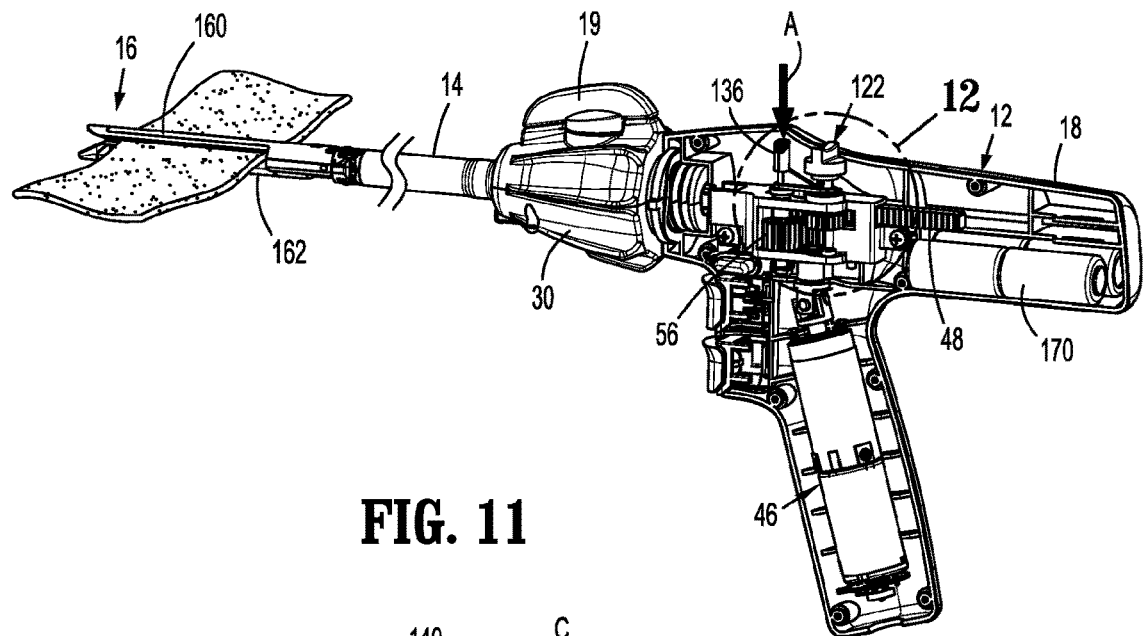
FIG. 11 is a side perspective view of the surgical device shown in FIG. 1 with a half-section of the housing of the handle assembly removed, the surgical device in a clamped position, and the manual retraction knob in an engaged position.
Figure 12:
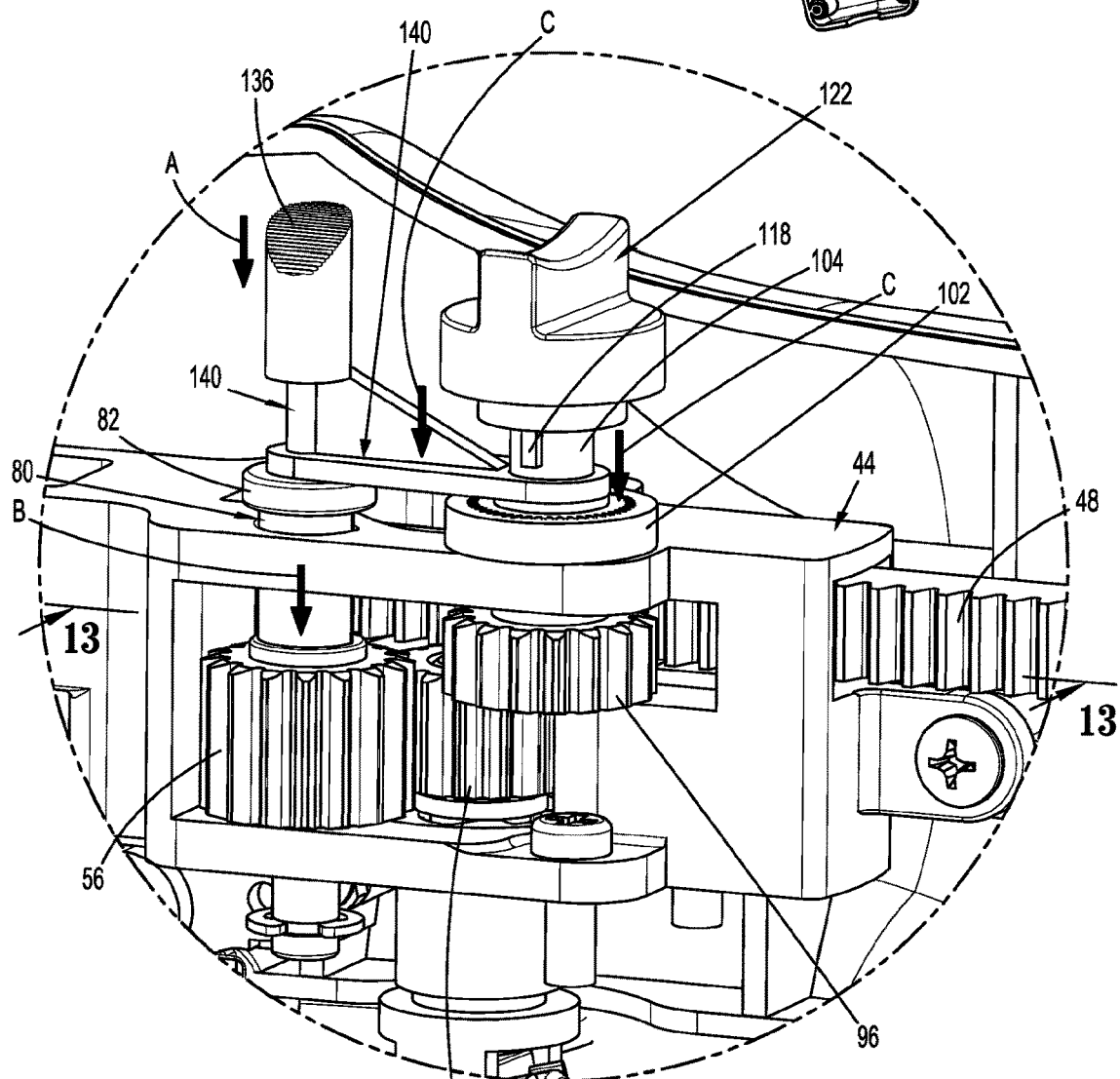
FIG. 12 is an enlarged view of the indicated area of detail shown in FIG. 11.
Figure 13:
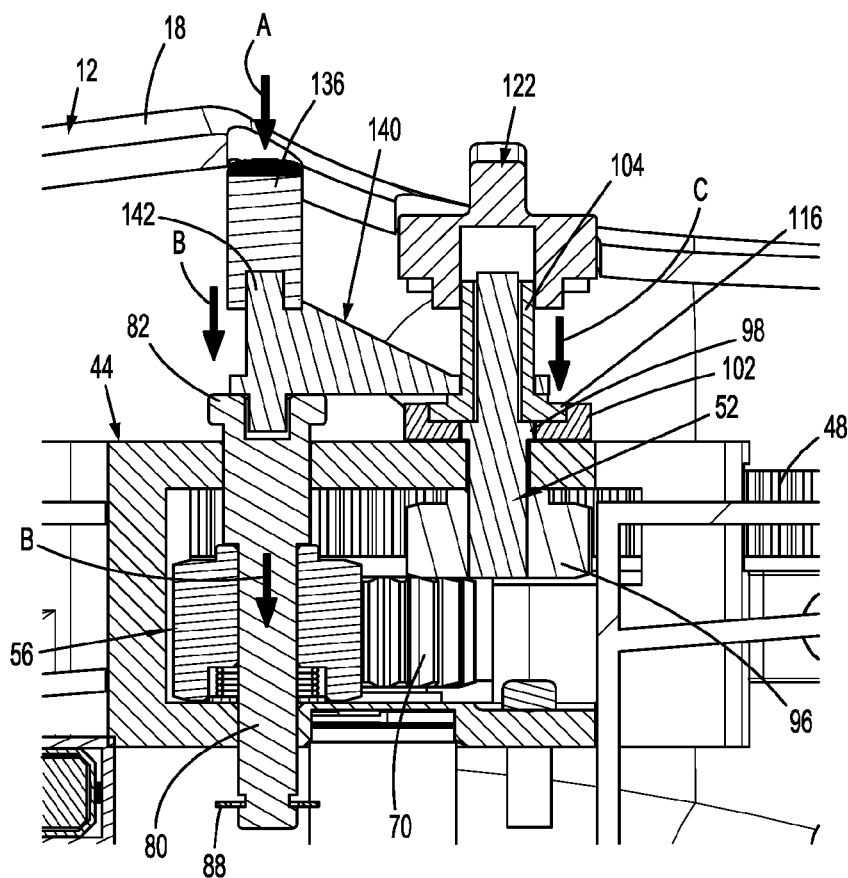
FIG. 13 is a cross-sectional view taken along section line 13-13 of FIG. 12.

FIGS. 11-13 illustrate the stapling device 10 with the tool assembly 16 in the clamped and fired position and the drive gear 56 and the upper gear 104 moved from their first positions to their second positions. When there is an interruption of power to the motor assembly 46, e.g., from batteries 170 (FIG. 11) supported within the handle assembly 12, the manual retraction knob 122 can be operated to manually retract the firing rod 50 (FIG. 4) and return the tool assembly 16 to the unclamped position (FIG. 1). To use the manual retraction knob 122 to retract the firing rod 50, the retraction button 136 is depressed in the direction of arrow "A" in FIG. 12 to move the post 80 and the drive gear 56 downwardly in the direction of arrows "B" in FIGS. 12 and 13 from the first position of the drive gear 56 to the second position of the drive gear 56. In the second position of the drive gear 56, the drive gear 56 is disengaged from the toothed rack 48. When the retraction button 122 and the post 80 move downwardly, the upper gear 104 of the clutch assembly 54, which is coupled to the retraction button 122 and the post 80 by the bridge 140, moves from its first position to its second position in the direction of arrows "C" in FIG. 12. In the second position of the upper gear 102 of the clutch assembly 54, the upper gear 104 is engaged with the lower gear 102 such that rotation of the retraction button 122 causes rotation of the upper and lower gears 104 and 102, respectively of the clutch assembly 54. As described above, the lower gear 102 includes a gear member 96 that is engaged with the toothed rack 48 such that rotation of the retraction button 122 causes longitudinal translation of the toothed rack 44 to retract (or advance) the toothed rack 44 and the firing rod 50. As described above, retraction of the firing rod 50 causes the tool assembly 16 to move from the clamped position (FIG. 11) to the unclamped position (FIG. 1).

Figure 14:
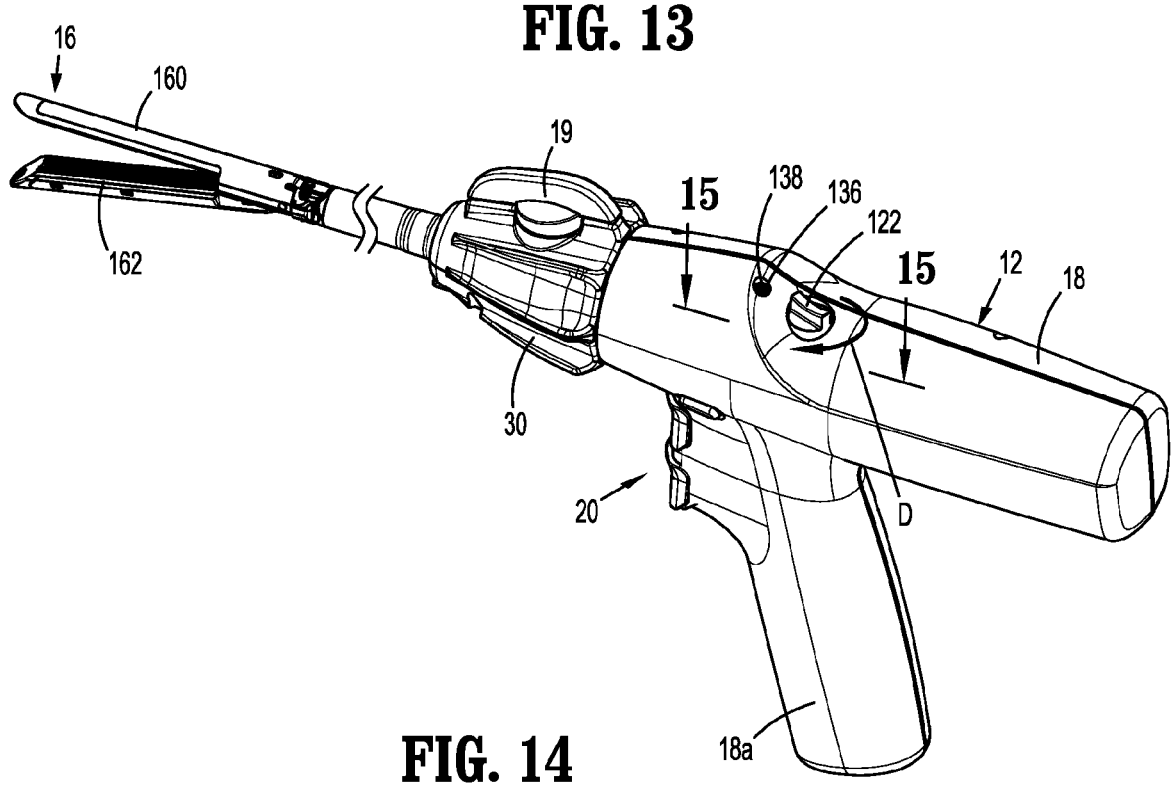
FIG. 14 is a side perspective view of the surgical device shown in FIG. 11 with the surgical device in a clamped position and the manual retraction knob in an engaged position.
Figure 15:
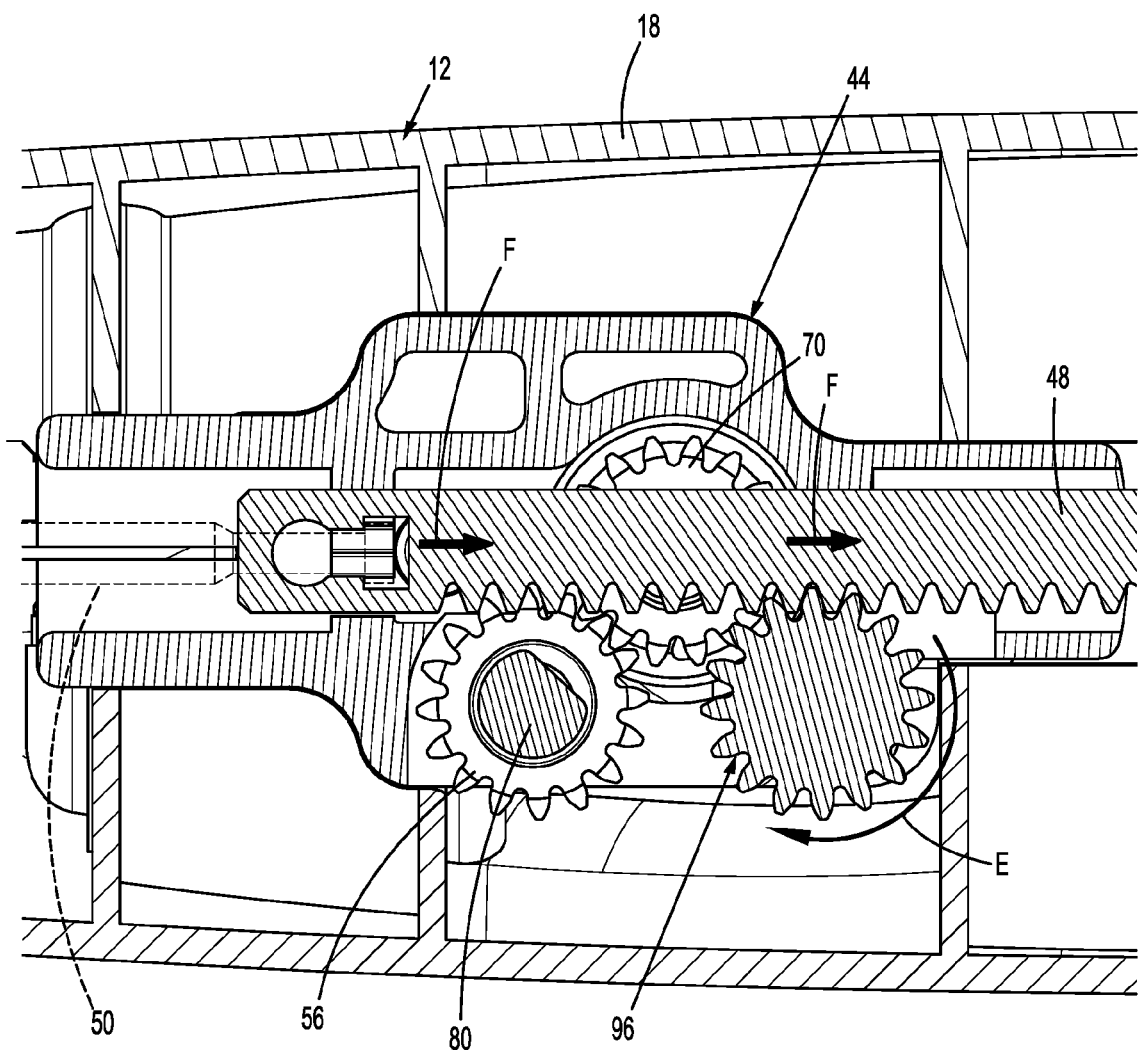
FIG. 15 is a cross-sectional view taken along section line 15-15 of FIG. 14.

FIGS. 14 and 15 illustrate the stapling device 10 with the drive gear 56 in the second position and the upper gear 104 of the clutch assembly 54 in the second position engaged with the lower gear 102 of the clutch assembly 54. When the upper gear 104 of the clutch assembly 54 is engaged with the lower gear 102 of the clutch assembly 54 and the retraction button 122 is rotated in the direction of arrow "D in FIG. 14, the gear member 96 of the manual retraction gear 52 rotates with the retraction button 122 in the direction of arrow "E" in FIG. 15 to move the toothed rack 48 in the direction of arrows "F" in FIG. 15. As the toothed rack 48 moves in the direction of arrows "F", the firing rod 50 is also moved in the direction of arrows "F" to move the tool assembly 16 to the unclamped position.

Persons skilled in the art will understand that the devices and methods specifically described herein and illustrated in the accompanying drawings are non-limiting exemplary aspects of the disclosure. It is envisioned that the elements and features illustrated or described in connection with one exemplary aspect of the disclosure may be combined with the elements and features of another without departing from the scope of the disclosure. As well, one skilled in the art will appreciate further features and advantages of the disclosure based on the above-described aspects of the disclosure. Accordingly, the disclosure is not to be limited by what has been particularly shown and described, except as indicated by the appended claims.

What is claimed is:

1. A handle assembly for a surgical device comprising:
   a housing defining a housing cavity;
   a gear casing supported within the housing cavity, the gear casing defining a casing cavity and a longitudinal channel that extends through the casing cavity;
   a motor assembly including an output shaft and an output gear secured to the output shaft, the output gear positioned within the casing cavity;
   a toothed rack received within the longitudinal channel of the gear casing and movable through the casing cavity between retracted and advanced positions;
   a post supporting a drive gear that is engaged with the output gear within the casing cavity, the post movable in relation to the gear casing to move the drive gear between first and second drive gear positions, the drive gear engaged with the toothed rack in the first drive gear position and disengaged from the toothed rack in the second drive gear position;
   a clutch assembly including an upper gear and a lower gear, the lower gear engaged with the rack, the upper gear movable between a first upper gear position and a second upper gear position, the upper gear engaged with the lower gear in the second upper gear position and disengaged from the lower gear in the first upper gear position, wherein rotation of the upper gear in the second upper gear position causes rotation of the lower gear;
   a manual retraction gear engaged with the rack, the manual retraction gear being coupled to the lower gear such that rotation of the lower gear causes rotation of the manual retraction gear; and
   a retraction knob positioned adjacent an outer surface of the housing, the retraction knob secured to the upper gear of the clutch assembly and manually rotatable to rotate the upper gear.

2. The handle assembly of claim 1, further including a retraction button secured to the post and extending through the housing, the retraction button being depressible to move the drive gear from the first drive gear position to the second drive gear position.

3. The handle assembly of claim 2, further including a bridge that secures the post to the upper gear of the clutch assembly, wherein depression of the retraction button causes movement of the drive gear from the first drive gear position to the second drive gear position and movement of the upper gear from the first upper gear position to the second upper gear position.

4. The handle assembly of claim 3, further including a biasing member positioned to urge the drive gear towards the first drive gear position.

5. The handle assembly of claim 1, wherein the upper gear of the clutch assembly includes a central hub and a gear member supported on one end of the central hub, the central hub defining a through bore and the gear member having an outer surface with gear teeth.

6. The handle assembly of claim 5, wherein the lower gear of the clutch assembly defines a cylindrical recess that is bounded by an inner annular wall having gear teeth, the gear teeth of the gear member of the upper gear being engaged with the gear teeth on the inner annular wall of the lower gear when the upper gear is in the second upper gear position such that rotation of the upper gear causes rotation of the lower gear.

7. The handle assembly of claim 6, wherein the lower gear of the clutch assembly defines a central bore, and the manual retraction gear includes a central shaft and a gear member, the gear member of the manual retraction gear being engaged with the toothed rack and the central shaft of the manual retraction gear extending through the central bore of the lower gear and into the through bore of the central hub of the upper gear.

8. The handle assembly of claim 7, wherein the lower gear defines notches that communicate with the central bore of the lower gear, and the central hub of the upper gear includes ribs that are received in the notches to secure the manual retraction gear to the lower gear.

9. A surgical stapling device comprising:
   an elongate body having a proximal portion and a distal portion;

a tool assembly supported on the distal portion of the elongate body; and a handle assembly coupled to the proximal portion of the elongate body, the handle assembly including:
   a housing defining a housing cavity;
   a gear casing supported within the housing cavity, the gear casing defining a casing cavity and a longitudinal channel that extends through the casing cavity;
   a motor assembly including an output shaft and an output gear secured to the output shaft, the output gear positioned within the casing cavity;
   a toothed rack received within the longitudinal channel of the gear casing and movable through the casing cavity between retracted and advanced positions;
   a post supporting a drive gear that is engaged with the output gear within the casing cavity, the post movable in relation to the gear casing to move the drive gear between first and second drive gear positions, the drive gear engaged with the toothed rack in the first drive gear position and disengaged from the toothed rack in the second drive gear position;
   a clutch assembly including an upper gear and a lower gear, the lower gear engaged with the rack, the upper gear movable between a first upper gear position and a second upper gear position, the upper gear engaged with the lower gear in the second upper gear position and disengaged from the lower gear in the first upper gear position, wherein rotation of the upper gear in the second upper gear position causes rotation of the lower gear;
   a manual retraction gear engaged with the rack, the manual retraction gear being coupled to the lower gear such that rotation of the lower gear causes rotation of the manual retraction gear; and
   a retraction knob positioned adjacent an outer surface of the housing, the retraction knob secured to the upper gear of the clutch assembly and manually rotatable to rotate the upper gear.

10. The surgical stapling device of claim 9, further including a retraction button secured to the post and extending through the housing, the retraction button being depressible to move the drive gear from the first drive gear position to the second drive gear position.

11. The surgical stapling device of claim 10, further including a bridge that secures the post to the upper gear of the clutch assembly, wherein depression of the retraction button causes movement of the drive gear from the first drive gear position to the second drive gear position and movement of the upper gear from the first upper gear position to the second upper gear position.

12. The surgical stapling device of claim 11, further including a biasing member positioned to urge the drive gear towards the first drive gear position.

13. The surgical stapling device of claim 9, wherein the upper gear of the clutch assembly includes a central hub and a gear member supported on one end of the central hub, the central hub defining a through bore and the gear member having an outer surface with gear teeth.

14. The surgical stapling device of claim 13, wherein the lower gear of the clutch assembly defines a cylindrical recess that is bounded by an inner annular wall having gear teeth, the gear teeth of the gear member of the upper gear being engaged with the gear teeth on the inner annular wall of the lower gear when the upper gear is in the second upper gear position such that rotation of the upper gear causes rotation of the lower gear.

15. The surgical stapling device of claim 14, wherein the lower gear of the clutch assembly defines a central bore, and the manual retraction gear includes a central shaft and a gear member, the gear member of the manual retraction gear being engaged with the toothed rack and the central shaft of the manual retraction gear extending through the central bore of the lower gear and into the through bore of the central hub of the upper gear.

16. The surgical stapling device of claim 15, wherein the lower gear defines notches that communicate with the central bore of the lower gear, and the central hub of the upper gear includes ribs that are received in the notches to secure the manual retraction gear to the lower gear.

17. A handle assembly for a surgical device comprising:
   a housing defining a housing cavity;
   a motor assembly including an output shaft and an output gear secured to the output shaft, the output gear positioned within the housing cavity;
   a toothed rack received within the housing cavity and movable through the housing cavity between retracted and advanced positions;
   a post supporting a drive gear that is engaged with the output gear within the housing cavity, the post movable to move the drive gear between first and second drive gear positions, the drive gear engaged with the toothed rack in the first drive gear position and disengaged from the toothed rack in the second drive gear position;
   a clutch assembly including an upper gear and a lower gear, the lower gear engaged with the rack, the upper gear movable between a first upper gear position and a second upper gear position, the upper gear engaged with the lower gear in the second upper gear position and disengaged from the lower gear in the first upper gear position, wherein rotation of the upper gear in the second upper gear position causes rotation of the lower gear;
   a manual retraction gear engaged with the rack, the manual retraction gear being coupled to the lower gear such that rotation of the lower gear causes rotation of the manual retraction gear; and
   a retraction knob positioned adjacent an outer surface of the housing, the retraction knob secured to the upper gear of the clutch assembly and manually rotatable to rotate the upper gear.

18. The handle assembly of claim 17, further including a retraction button secured to the post and extending through the housing, the retraction button being depressible to move the drive gear from the first drive gear position to the second drive gear position.

19. The handle assembly of claim 18, further including a bridge that secures the post to the upper gear of the clutch assembly, wherein depression of the retraction button causes movement of the drive gear from the first drive gear position to the second drive gear position and movement of the upper gear from the first upper gear position to the second upper gear position.

20. The handle assembly of claim 19, further including a biasing member positioned to urge the drive gear towards the first drive gear position.

* * * * *